(12) United States Patent
Lamie

(10) Patent No.: US 10,040,264 B2
(45) Date of Patent: Aug. 7, 2018

(54) CONTAINER BOTTOM HEATER

(71) Applicant: Dart Container Corporation, Mason, MI (US)

(72) Inventor: Randy John Lamie, Holt, MI (US)

(73) Assignee: Dart Container Corporation, Mason, MI (US)

( * ) Notice: Subject to any disclaimer, the term of this patent is extended or adjusted under 35 U.S.C. 154(b) by 344 days.

(21) Appl. No.: 14/676,087

(22) Filed: Apr. 1, 2015

(65) Prior Publication Data
US 2016/0288411 A1 Oct. 6, 2016

(51) Int. Cl.
| | |
|---|---|
| B29C 65/00 | (2006.01) |
| B65D 6/00 | (2006.01) |
| B29C 65/10 | (2006.01) |
| B31D 5/00 | (2017.01) |
| B29L 31/00 | (2006.01) |
| B29C 65/56 | (2006.01) |
| B29C 65/78 | (2006.01) |

(52) U.S. Cl.
CPC .............. *B31D 5/00* (2013.01); *B29C 65/103* (2013.01); *B29C 65/568* (2013.01); *B29C 65/7882* (2013.01); *B29C 66/12441* (2013.01); *B29C 66/542* (2013.01); *B29C 66/612* (2013.01); *B29C 66/727* (2013.01); *B29C 66/72328* (2013.01); *B29C 66/73921* (2013.01); *B29C 66/80* (2013.01); *B29L 2031/7132* (2013.01)

(58) Field of Classification Search
CPC ..... B29C 65/103; B29C 66/01; B29C 66/851; B29C 65/568; B29C 65/7882; B29C 66/12441; B29C 66/542; B29C 66/612; B29C 66/72328; B29C 66/727; B29C 66/73921; B29C 66/80; B65D 11/00; B31D 5/00; B29L 2031/7132
USPC ......................................................... 156/500
See application file for complete search history.

(56) References Cited

U.S. PATENT DOCUMENTS

| | | | | |
|---|---|---|---|---|
| 3,028,798 A | * | 4/1962 | Allen | B29C 57/12 |
| | | | | 156/69 |
| 3,392,458 A | | 7/1968 | Braun | |
| 3,439,590 A | * | 4/1969 | Crafton | B29C 65/10 |
| | | | | 156/497 |
| 4,349,400 A | | 9/1982 | Gilden | |
| 4,409,045 A | * | 10/1983 | Busse | B29C 66/542 |
| | | | | 156/446 |
| 4,490,130 A | * | 12/1984 | Konzal | B29B 13/025 |
| | | | | 432/226 |

(Continued)

FOREIGN PATENT DOCUMENTS

EP 0576751 A1 1/1994

OTHER PUBLICATIONS

European Search Report for British Counterpart GB1605444.7, dated Sep. 7, 2016.

*Primary Examiner* — Philip Tucker
*Assistant Examiner* — Vicki Wu
(74) *Attorney, Agent, or Firm* — McGarry Bair PC

(57) ABSTRACT

A bottom heater for use in assembling a container bottom and a sleeve includes a body having a peripheral wall and a heated air passage terminating in an outlet in the peripheral wall. A shape of at least a portion of the peripheral wall defining the outlet is such that heated air exiting the outlet is fluidly attached to an adjacent portion of the peripheral wall after exit because of the Coanda effect.

28 Claims, 10 Drawing Sheets

(56) References Cited

U.S. PATENT DOCUMENTS

| | | | |
|---|---|---|---|
| 4,511,426 A * | 4/1985 | Linner | B29B 13/025 |
| | | | 156/497 |
| 4,957,581 A * | 9/1990 | Jahrig | B29B 13/025 |
| | | | 156/309.9 |
| 5,062,568 A | 11/1991 | Hill et al. | |
| 5,324,249 A * | 6/1994 | Konzal | B31B 50/00 |
| | | | 493/106 |
| 5,507,640 A * | 4/1996 | Gilmer | B29C 44/5636 |
| | | | 34/104 |
| 5,678,391 A | 10/1997 | Andersen et al. | |
| 5,948,341 A * | 9/1999 | Diamond | B29C 45/4225 |
| | | | 164/269 |
| 8,459,528 B2 | 6/2013 | Hinkov | |
| 2005/0176363 A1* | 8/2005 | Gehring | B60H 1/3414 |
| | | | 454/153 |
| 2006/0124719 A1 | 6/2006 | Mannlein | |
| 2011/0049220 A1* | 3/2011 | Hinkov | B29B 13/025 |
| | | | 228/46 |
| 2015/0099615 A1* | 4/2015 | Leser | B31B 1/64 |
| | | | 493/105 |
| 2015/0352780 A1* | 12/2015 | Messerschmid | B31B 1/00 |
| | | | 156/189 |

\* cited by examiner

CONTAINER BOTTOM HEATER

BACKGROUND

A typical two-piece cup includes a sleeve forming the side wall of the container and a container bottom sealed with one end of the sleeve. One method for sealing the container bottom with the sleeve involves the use of a heat sealable material that is softened when heated and bonds two surfaces together when cooled and solidified. The container sleeve can include an end flange that is folded inward and overlaps with a portion of the container bottom to form the container bottom seal. The overlapping portion of the container bottom can be provided with a heat sealable material that can be softened by a suitable bottom heater prior to folding the sleeve end flange inward to overlap the sleeve with the container bottom. After the sleeve end flange is folded and overlapped with the container bottom, the heat sealable material can cool and solidify, bonding the overlapping portions together. The bottom heating process can affect the characteristics of the bottom seal. Too much heat can cause the heat sealable material to separate from the container surface and may damage parts of the cup. Not enough heat can result in insufficient softening of heat sealable material or not softening enough of the heat sealable material, which can lead to incomplete seal formation.

BRIEF SUMMARY

According to one embodiment of the invention, a container forming machine for assembling a container bottom to a sleeve to form a container comprises a mandrel and a bottom heater. The bottom heater includes a body having a peripheral wall and a heated air passage terminating in an outlet in the peripheral wall. A shape of at least a portion of the peripheral wall defining the outlet is such that heated air exiting the outlet is fluidly attached to an adjacent portion of the peripheral wall after exit because of the Coanda effect.

According to another embodiment, a bottom heater for use in assembling a container bottom and a sleeve includes a body having a peripheral wall and a heated air passage terminating in an outlet in the peripheral wall. A shape of at least a portion of the peripheral wall defining the outlet is such that heated air exiting the outlet is fluidly attached to an adjacent portion of the peripheral wall after exit because of the Coanda effect.

DETAILED DESCRIPTION

Figure 1:
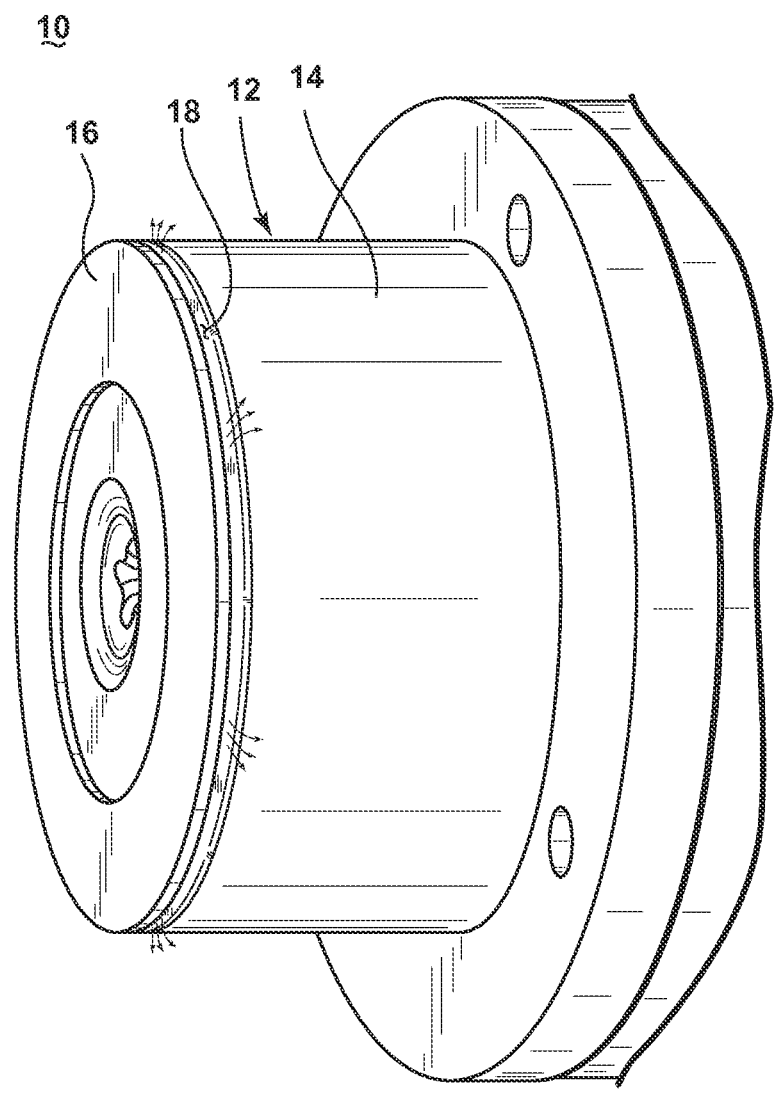
FIG. 1 is a perspective view of a bottom heater according to an embodiment of the invention.
Figure 2:
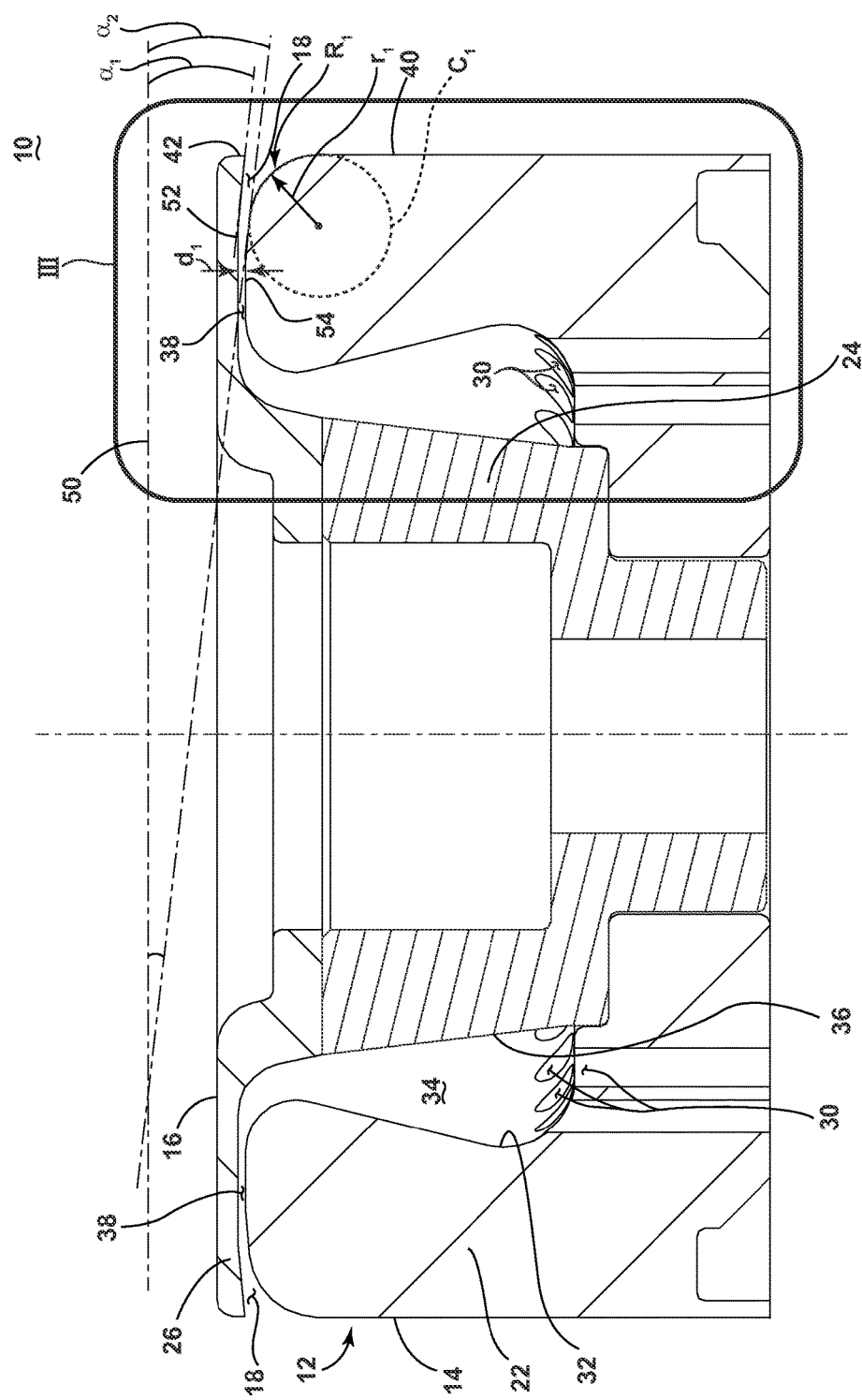
FIG. 2 is a cross-sectional view of the bottom heater of FIG. 1.

FIGS. 1 and 2 illustrate a bottom heater 10 which utilizes heated air for heating one or more surfaces of a two piece container comprising a sleeve and a bottom to facilitate bonding the sleeve and bottom to assemble the container. By way of introduction, the sleeve typically includes a flange at one end which is folded inward to overlap with at least a portion of the bottom to seal the sleeve with the bottom to close off one end of the sleeve. Either or both of the overlapping surfaces of the sleeve or container bottom can include a heat sealable bonding material that can be heated by the bottom heater 10, which, when cooled and solidified, forms a seal between the overlapping surfaces of the sleeve and container bottom. The container can be any type of container, such as a cup or a bowl, for example, made from any suitable material or combination of materials, such as paper, foam, or a thermoplastic material. The bottom heater 10 can be positionable with respect to the sleeve and the bottom to heat at least the portions of the sleeve and/or the bottom that are overlapped during assembly of the container. As illustrated in FIG. 1, the bottom heater 10 can include a body 12 having a peripheral wall 14 and an end wall 16. An outlet 18 can be provided in the peripheral wall 14. The bottom heater 10 can be coupled with a supply of heated air (not shown), as is known in the art.

Referring now to FIG. 2, the body 12 includes an outer body portion 22, an inner body portion 24 and a top plate 26 which forms the end wall 16 and a portion of the peripheral wall 14. One or more of the outer body portion 22, inner body portion 24 and/or top plate 26 can be integrally formed or formed separately and assembled with the remaining parts. The outer body portion 22 includes a plurality of apertures 30 located in an inner surface 32 of the outer body portion 22. The bottom heater 10 can be fluidly coupled with an air heating system (not shown) for supplying heated air through the apertures 30 to a central cavity 34 at least partially defined by the inner surface 32 of the outer body portion 22 and an outer surface 36 of the inner body portion 24. The central cavity 34 is fluidly coupled with the outlet 18 at an upper portion thereof, opposite the apertures 30, through an air passage 38 to provide heated gas to the outlet 18. While FIG. 2 illustrates 2 rows of radially distributed apertures 30, it will be understood that the size, number, location, and spacing can be selected to provide the desired flow of heated air to the central cavity 34.

Figure 3:
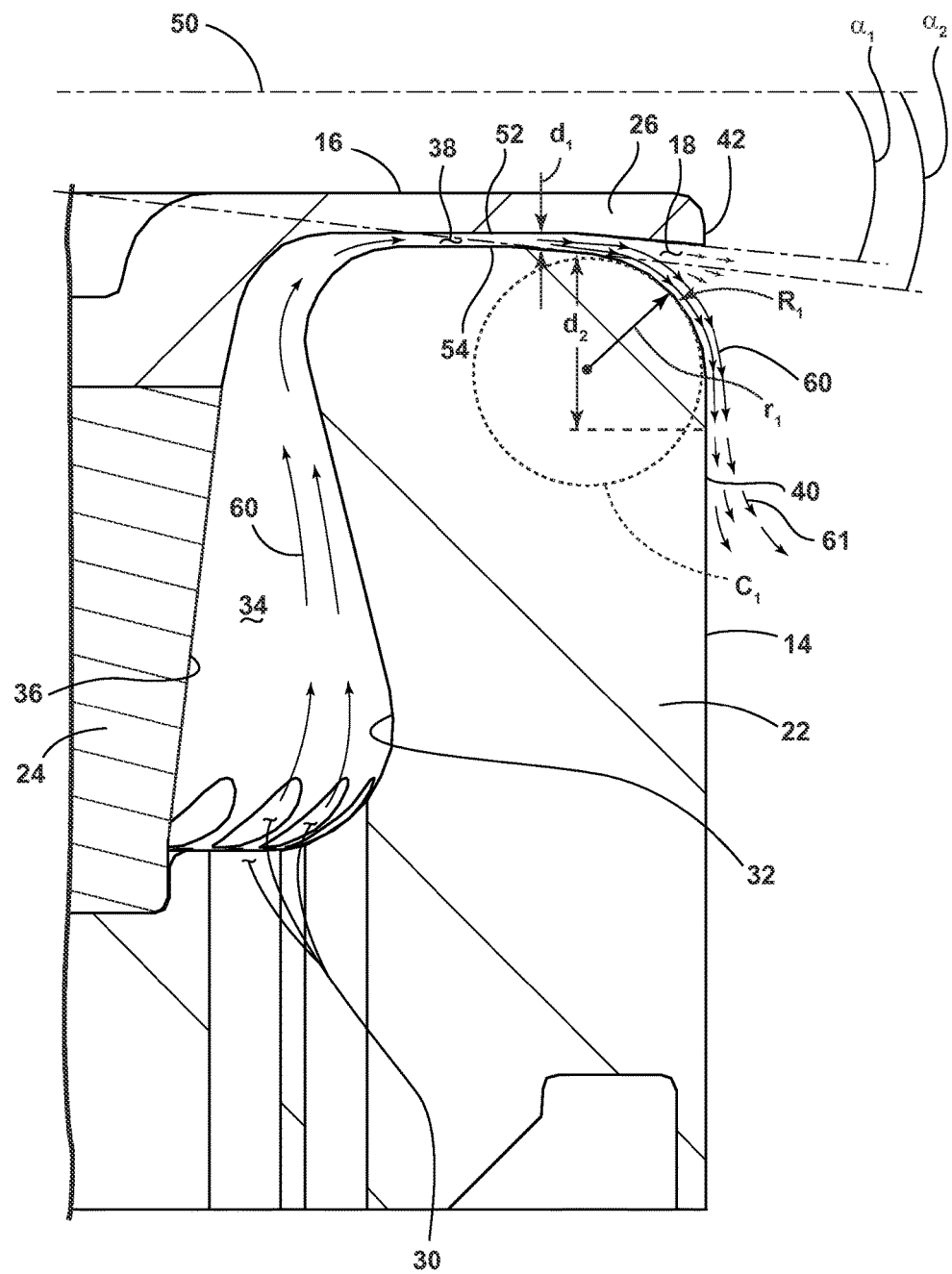
FIG. 3 is a partial cross-sectional view of the portion of FIG. 2 indicated by box III.

Referring now to FIGS. 2 and 3, the outlet 18 separates the peripheral wall 14 into a first portion 40, defined by the outer body portion 22, and a second portion 42, defined by the top plate 26. The first portion 40 can include a curved surface $R_1$ defining a portion of the outlet 18 to control the flow of air through the outlet 18. The curved surface $R_1$ can be defined as having a radius of curvature which is defined as the radius of a circular arc that best fits the curved surface of the first portion 40 defining the outlet 18. As illustrated in FIGS. 2 and 3, the radius of curvature of the curved surface $R_1$ of the first portion 40 defining the outlet 18 can be defined by a radius $r_1$ of an imaginary circle $C_1$ that best fits the curved surface $R_1$. The radius of curvature of the curved surface $R_1$ can be determined using radius gauges having a reference radius of curvature based on which reference radius best fits the part, as is known in the art. Alternatively, the radius of curvature of the curved surface $R_1$ can be determined using a coordinate measuring machine (CMM).

In addition to the curved surface $R_1$ of the first portion 40, the air passage 38 can also be angled with respect to a horizontal axis 50 of the body 12 to facilitate the flow of heated air in the desired direction. The air passage 38 is defined by a top wall 52 of the top plate 26 and a bottom wall 54 of the outer body portion 22 having a distance $d_1$ between the top wall 52 and bottom wall 54. At least a portion of the top wall 52 defining a portion of the outlet 18 can be provided at an angle $\alpha 1$ with respect to the axis 50. Additionally, or alternatively, at least a portion of the bottom wall 54 adjacent the first portion 40 having the curved surface $R_1$ can be provided at an angle $\alpha 2$ with respect to the horizontal axis 50. The angled portion of the bottom wall 54 can be configured to lead into the curved surface $R_1$ to control the flow of air through the outlet 18. For example, as illustrated in the embodiment of FIGS. 2 and 3, the angled portion of the bottom wall 54 can generally be configured as a tangent to the imaginary circle $C_1$ defining the curved surface $R_1$. The angles $\alpha 1$ and $\alpha 2$ can be the same or different and can be selected so as to provide the desired direction of air flow.

The shape of the outlet 18 as defined by the first and/or second portions 40, 42 of the peripheral wall 14 and the air passage 38 can be configured to control a direction of flow of air through the outlet 18 as well as a behavior of the flow of air to generate a Coanda effect to control the distribution of heat to the sleeve and bottom of the container during the container forming process. The Coanda effect is a well-known aerodynamic term for the phenomenon for the tendency of a fluid jet of air issued tangentially onto a curved or angled solid surface to adhere to that surface. The air jet accelerates the air between the jet and the surface and the surface prevents new air from flowing into the space between the jet and the surface, which reduces the pressure in this space. Thus, the jet is sucked towards the surface and stays attached to it. At some point along the surface, the Coanda effect breaks down and the air flow separates from the surface.

Referring again to FIG. 3, in use, heated air exiting the outlet 18, as illustrated by arrows 60, follows the curved surface $R_1$ of the first portion 40 defining the outlet 18 and flows downward along the peripheral wall 14 away from the end wall 16 for a predetermined distance $d_2$. At some point along the peripheral wall 14, after the predetermined distance $d_2$, the Coanda effect breaks down and the heated air flow separates from the peripheral wall 14, as illustrated by arrows 61. The angles $\alpha 1$ and $\alpha 2$ in the top and bottom walls 52 and 54, respectively, of the air passage 38 further facilitate directing the heated air 60 exiting the outlet 18 to follow the curved surface $R_1$ of the first portion 40. The shape of the outlet 18, as defined by the radius of curvature in the first and second portions 40, 42 of the peripheral wall 14, as well as additional parameters, non-limiting examples of which include the dimension $d_1$ of the air passage 38, the angle of the walls defining the air passage 38, and the speed of the air supplied to the central cavity 34, can be referred to as the Coanda effect parameters. One or more of the Coanda effect parameters can be adjusted to provide the desired direction and amount of the Coanda effect to the air exiting the outlet 18. As used herein, the amount of the Coanda effect refers to the proportion of the air exiting the outlet 18 that exhibits the Coanda effect by becoming attached to the peripheral wall 14. The direction of the Coanda effect refers to the direction in which the air exhibiting the Coanda effect travels. Depending on the Coanda effect parameters, some of the air exiting the outlet 18 may not exhibit the Coanda effect and additionally may not flow in the same direction as the air exhibiting the Coanda effect. In some cases, a proportion of the air exiting the outlet 18 may flow perpendicular to or in an opposite direction of the air flow exhibiting the Coanda effect.

The Coanda effect parameters can also be adjusted to control the distance the air exhibiting the Coanda effect flows along the peripheral wall 14 before the Coanda effect breaks down and the air flow separates from the peripheral wall 14. The distance the air exhibiting the Coanda effect travels along the peripheral wall 14 can correspond to a functional heating area in the adjacent surface of the sleeve and/or container bottom that corresponds to an overlapping portion of the sleeve and the container bottom in the assembled container, which will be described in more detail below. In one example, one or more of the Coanda parameters can be determined using one or more algorithms determined experimentally using techniques such as thermal imaging and/or computational fluid dynamics (CFD) modeling. Additionally, or alternatively, one or more of the Coanda parameters can be determined by trial and error until the desired heating control is achieved.

Figure 4:
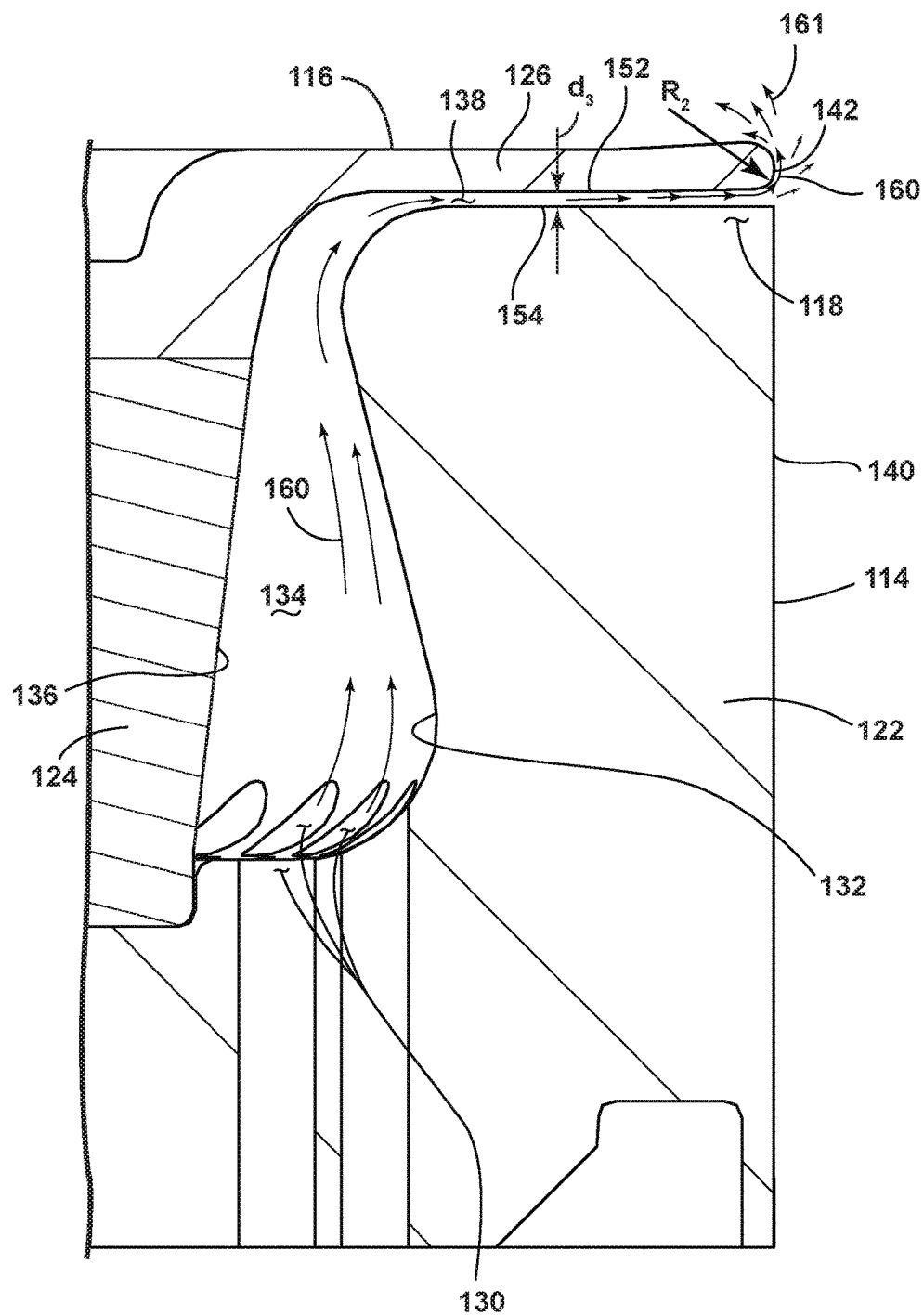
FIG. 4 is a partial cross-sectional view of a bottom heater according to another embodiment of the invention.

FIG. 4 illustrates another embodiment of the bottom heater 110 which is similar to the bottom heater 10 except for the shape of the peripheral wall 114 defining the outlet 118. Therefore, elements of the bottom heater 110 similar to those of bottom heater 10 are numbered with the prefix 100. As illustrated in FIG. 4, the second portion 142 defining the outlet 118 is provided with a curved surface $R_2$ to control the flow of air through the outlet 118. The curved surface $R_2$ is configured to induce a Coanda effect in air exiting the outlet 118 that directs at least a portion of the air upwards toward the end wall 116, as illustrated by arrows 160. The angles in the top and bottom walls 152, 154 defining the air passage 138, as well as the dimensions $d_3$ of the air passage 138, can be configured to control an amount and direction of the Coanda effect in the same manner as described above for the bottom heater 110 of FIG. 2. It is also within the scope of the invention for both the first portion 40, 140 and the second portion 42, 142 to include a curved surface, which may be the same or different in order to control the direction and amount of Coanda effect for air exiting the outlet 18, 118.

While the outlet 18 is described as a continuous opening extending around the perimeter of the peripheral wall 14, it is within the scope of the invention for the outlet 18 to be in the form of a plurality of discrete openings. The portions of the peripheral wall 14 defining each of the discrete openings can be shaped in the same manner as described above for the outlet 18 such that at least a portion of the heated air exiting the openings is fluidly attached to an adjacent portion of the peripheral wall 14 after exit because of the Coanda effect. The Coanda effect parameters described above with respect to the outlet 18 can be varied in a similar manner to control the direction and amount of Coanda effect of air exiting each of the plurality of discrete openings.

Figure 5:
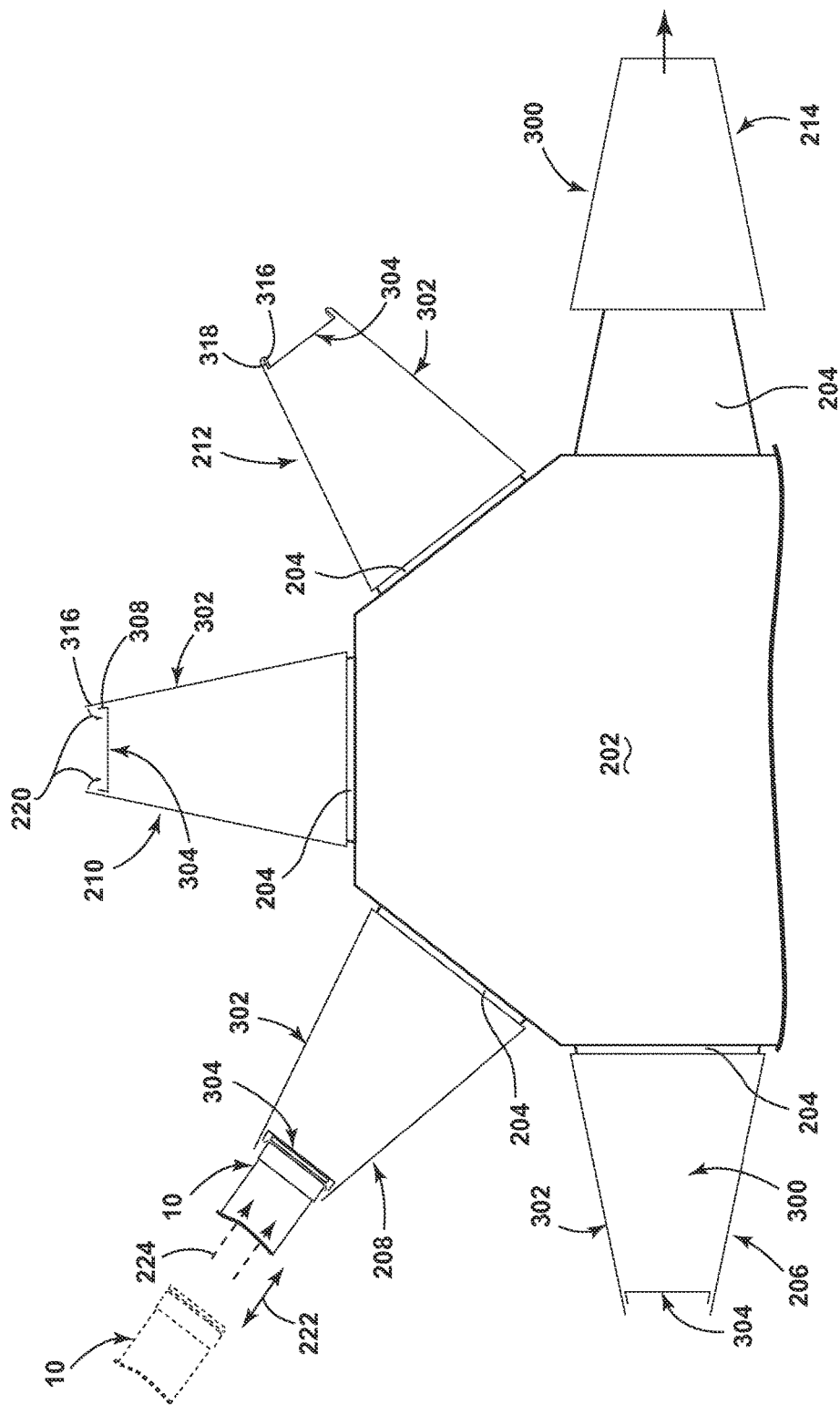
FIG. 5 is a schematic representation of a container forming machine according to an embodiment of the invention.
Figure 6:
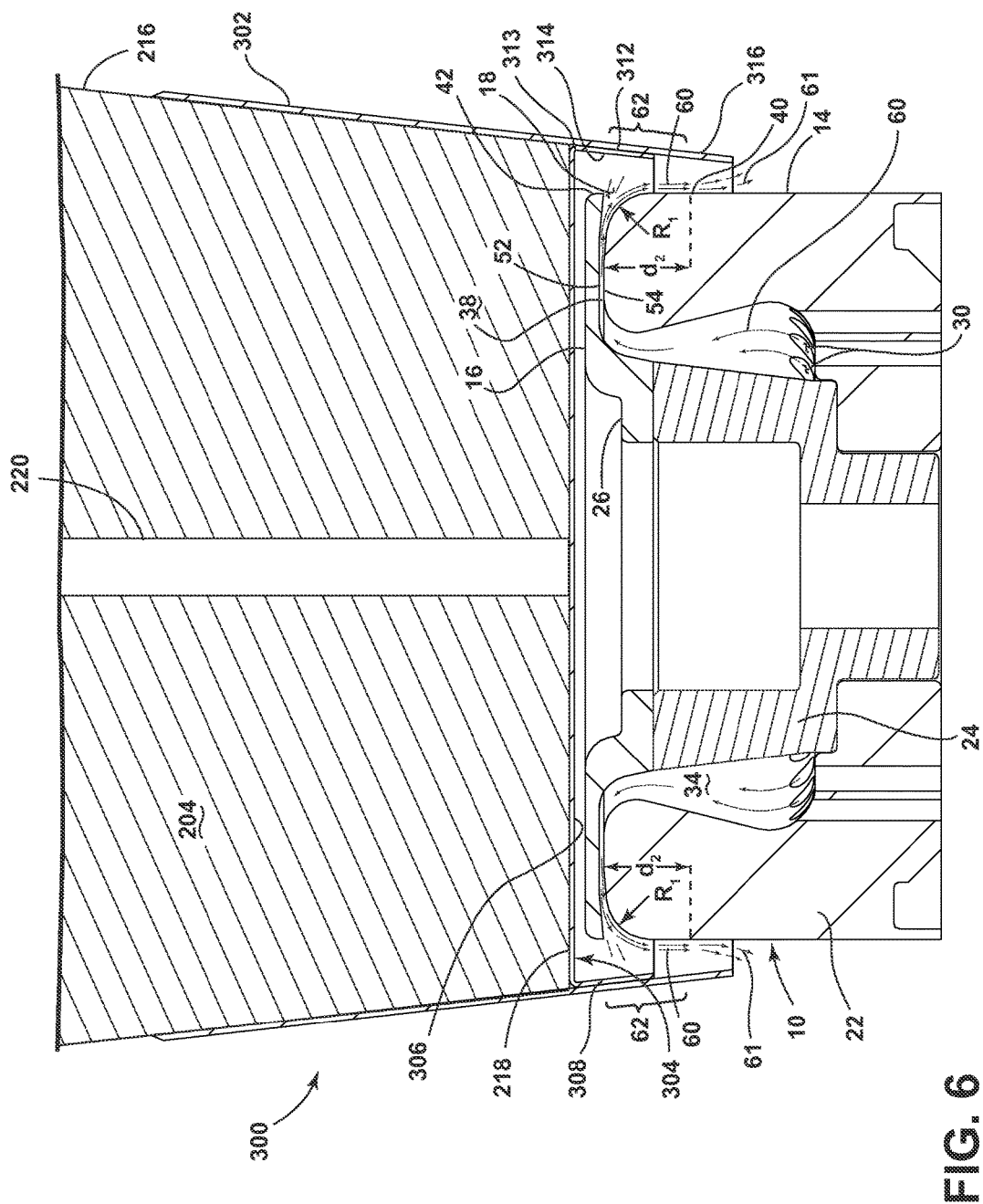
FIG. 6 is a cross-sectional view of a bottom heater for use with a container bottom according to an embodiment of the invention.

FIGS. 5 and 6 illustrate the use of the bottom heater 10 and the Coanda effect in the context of an exemplary container forming machine 200 used to assemble a container 300 in the form of a cup. The container forming machine 200 can include a number of work stations for assembling the parts of the cup 300. It will be understood that additional or alternative work stations can be used in assembling the cup 300 without deviating from the scope of the invention.

As illustrated in FIG. 5, the container forming machine 200 includes a turret 202 that indexes a mandrel 204 through successive work stations 206-214. As can best be seen in FIG. 6, the mandrel 204 can include a surface 216 terminating in a first end 218 which includes a vacuum conduit 220 for maintaining a cup bottom 304 in position on the mandrel 204. Referring again to FIG. 5, at work station 206, a sleeve blank can be wrapped around the surface 216 to form a cup sleeve 302 at least partially supported by the surface 216. A seam clamp (not shown) can be used to bond side edges of the sleeve blank to form the cup sleeve 302. A plunger or other suitable means can be used to position the cup bottom 304 inside the cup sleeve 302, adjacent the first end 218 of the mandrel 204.

Referring again to FIG. 5, at work station 208, the bottom heater 10 can be moved into and out of alignment with the sleeve 302 and the cup bottom 304 on a suitable support arm (not shown) as indicated by arrows 222. Heated air, as indicated by arrows 224 can be supplied through the bottom heater 10 to heat at least a portion of the sleeve 302 and/or the cup bottom 304 to soften a heat sealable material provided on the sleeve 302 and/or cup bottom 304 that forms the cup bottom seal when cooled and solidified. The use of the bottom heater 10 to form the heat seal between the sleeve 302 and the cup bottom 304 during a cup bottom heat sealing process is described in detail with respect to FIG. 6. In general, there will be a gap between the cup bottom 304 and the end wall 16 of the bottom heater 10 so as to not transfer heat directly to the cup bottom 304. Exemplary gap distances are in the range of 0.015 to 0.06 inches, although the distance may be smaller or greater depending on the configuration of the cup 300 and the desired area of heating.

As illustrated in FIG. 6, the cup bottom 304 includes a bottom wall or floor 306 held in position adjacent the first end 218 of the mandrel 204 and a downwardly depending skirt 308. The skirt 308 has an exterior surface 312 adjacent an interior surface of the sleeve 302 and an interior surface 314, opposite the exterior surface 312, and intersects the floor 306 at a corner 313. The sleeve 302 includes an end flange 316 that extends beyond the skirt 308 of the cup bottom 304. During the cup bottom heat sealing process, the end flange 316 is folded inward such that the end flange 316 overlaps at least a portion of the cup bottom skirt 308. At least a portion of the interior surface 314 of the skirt 308 and/or the end flange 316 forming the overlapping portion is provided with a heat sealable material, non-limiting examples of which include polyethylene or polylactic acid. The bottom heater 10 can be used to heat the heat sealable material such that the end flange 316 bonds with the interior surface 314 of the skirt 308 when the end flange 316 overlaps the skirt 308.

Still referring to FIG. 6, during the heating process at work station 208, heated air, as illustrated by arrows 60, flows into the central cavity 34 from a suitable air heating system (not shown) through the apertures 30. As the air flows through the central cavity toward the air passage 38, the heated air 60 is compressed and directed perpendicular to a vertical axis of the bottom heater 10 through the air passage 38. As the heated air 60 exits through the outlet 18, at least a portion of the heated air 60 exhibits the Coanda effect and follows the curved surface $R_1$ of the first portion 40 along the peripheral wall 14. The angles α1 and α2 in the top and bottom walls 52 and 54, respectively, (see FIG. 3) of the air passage 38 can be provided to further facilitate directing the heated air 60 exiting the outlet 18 to follow the curved surface $R_1$ of the first portion 40 along the peripheral wall 14 and away from the floor 306 of the cup bottom 304. As the heated air 60 flows along the peripheral wall 14 because of the Coanda effect, the adjacent surfaces of the cup 300 are heated. The amount and direction of the Coanda effect can be controlled such that the distance $d_2$ corresponding to the distance that the heated air remains attached to the first portion 40 of the peripheral wall 14 for a predetermined distance. In general, for a given air flow, it has been found that as the size of the radius of curvature of the curved surface $R_1$ of the first portion 40 increases, the longer the heated air 60 remains attached to the surface of the curve, the greater the Coanda effect, and the larger the distance $d_2$. The distance $d_2$ can at least partially overlap with a functional heating area 62 of the cup 300 that corresponds at least in part to an overlapping portion of the end flange 316 and/or the skirt 308 in the cup bottom seal. The amount and direction of the Coanda effect can be controlled to heat the desired functional heating area 62 of the skirt 308 and/or the end flange 316 with the desired distribution of heat prior to folding the end flange 316 and crimping the skirt 308 and end flange 316 to form the cup bottom seal. The functional heating area 62 can correspond to adjacent portions of the skirt 308 and the end flange 316 (as illustrated) or only a portion of the skirt 308 or only a portion of the end flange 316. It will be understood that even after the Coanda effect breaks down and the heated air separates from the peripheral wall 14, as illustrated by arrows 61, adjacent surfaces of the cup 300 may still be heated to some extent.

Returning to FIG. 5, once the heat sealable material is heated by the bottom heater 10, the mandrel 204 indexes to work station 210 where the end flange 316 of cup sleeve 302 is folded inward to overlap with the cup bottom skirt 308, as illustrated by arrows 220. At work station 212, pressure can be applied to the overlapping portions of the end flange 316 and skirt 308 to facilitate bonding of the overlapping portions as the heat sealable material solidifies and cools. The mandrel 204 can then be indexed to work station 214 where the assembled cup 300 is ejected and optionally moved to additional finishing stations, such as printing or rim curling.

Figure 7:
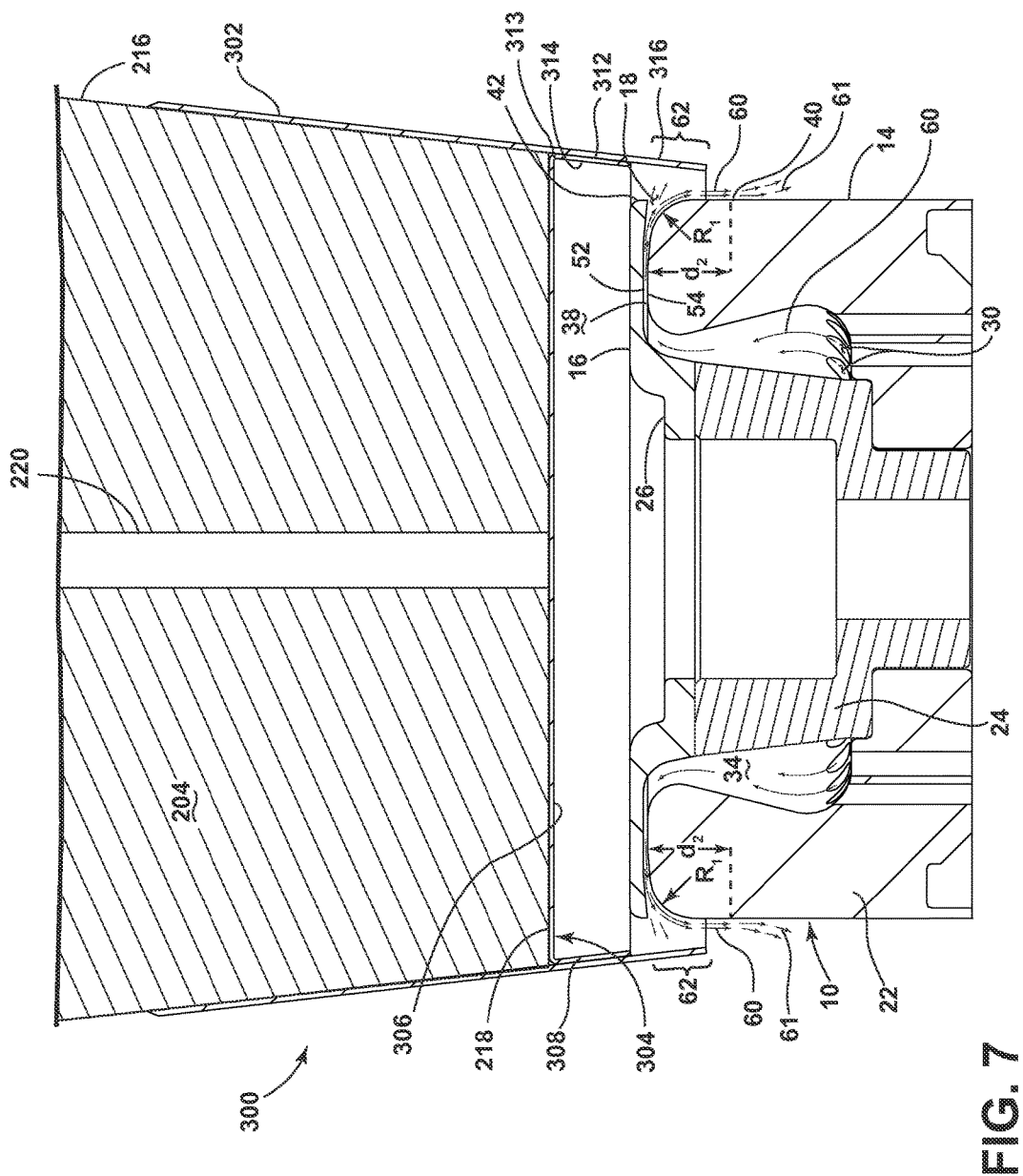
FIG. 7 is a cross-sectional view of a bottom heater for use with a container bottom according to an embodiment of the invention.

FIG. 7 illustrates an alternative positioning of the bottom heater 10 with respect to the cup 300 during the cup bottom heat sealing process. As illustrated in FIG. 7, the bottom heater 10 can be positioned with respect to the cup bottom 304 such that the outlet 18 of the bottom heater 10 is adjacent the end flange 316 rather than the skirt 308, as illustrated in FIG. 6. In the example of FIG. 6, the functional area 62 corresponds to a portion of both the skirt 308 and the end flange 316 such that both are heated in preparation for formation of the cup bottom heat seal. In the example of FIG. 7, the functional heating area 62 extends along only the end flange 316 in preparation for formation of the cup bottom heat seal.

While the embodiments of the invention are described in the context of a container in which the sleeve is sealed with a skirt of the container bottom, it is also within the scope of the invention for the bottom heater to be used with other container bottom configurations, such as a configuration in which the sleeve is bonded to the bottom wall of the container bottom.

Table 1 illustrates exemplary specifications for the bottom heater according to an embodiment of the invention in which the heated air exiting the outlet of the bottom heater exhibits the Coanda effect. The exemplary bottom heater was tested with a hot air gun blowing air at 500 and 900 standard cubic feet per minute (SCFM).

TABLE 1

Exemplary bottom heater specifications.

| Bottom heater element | Specification |
| --- | --- |
| Radius of curvature of $R_1$ | 0.12 inches (range 0.0001 to 0.25 inches) |
| α1 | 5 degrees (range 0 to 10 degrees) |
| α2 | 5 degrees (range 0 to 10 degrees) |
| $d_1$ | 0.015 inches (range 0.005 to 0.0125 inches) |

Figure 8:
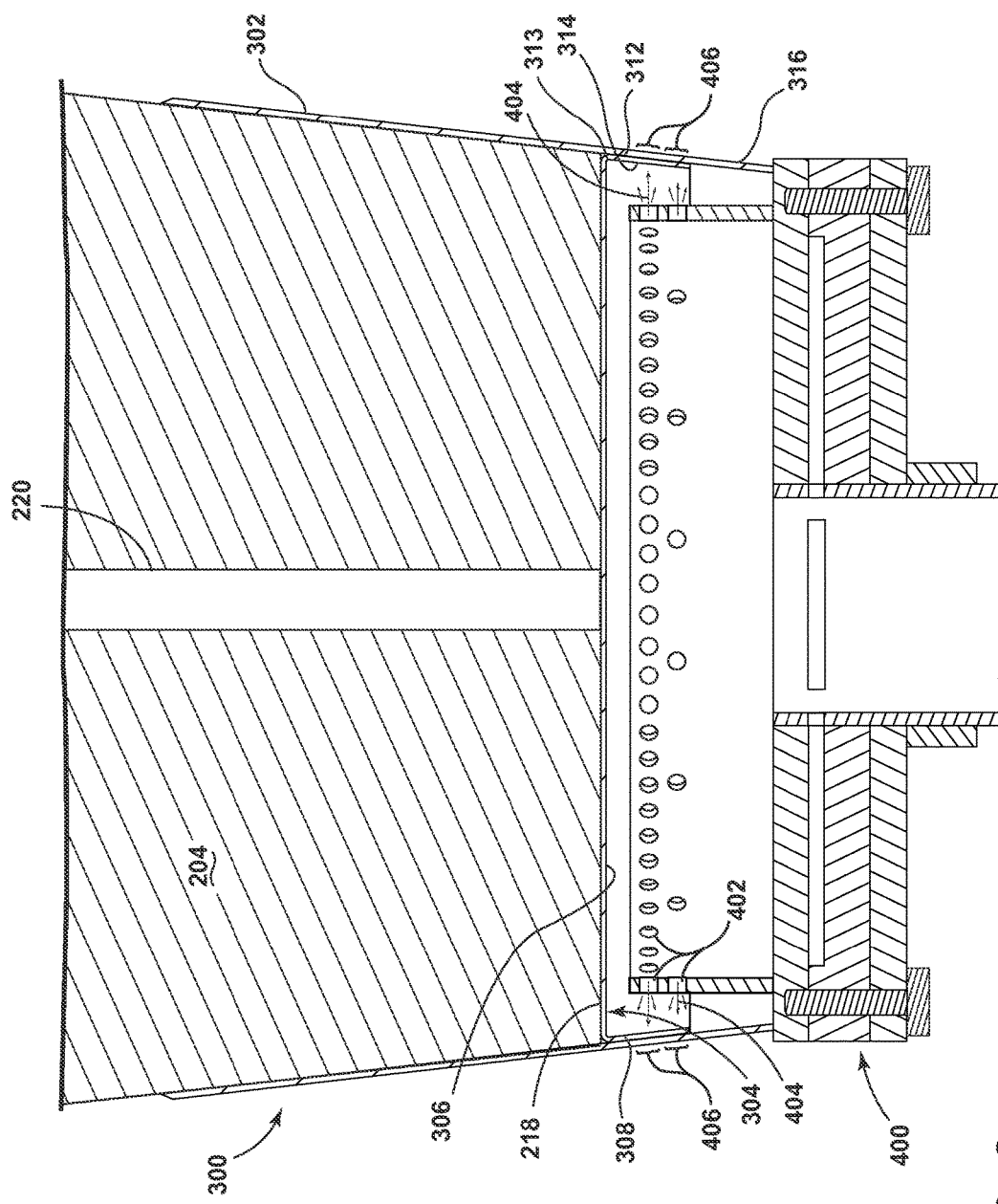
FIG. 8 is a cross-section view of a traditional bottom heater for use with a container bottom.

FIG. 8 illustrates the use of a traditional bottom heater 400 with the cup 300 during a bottom heat sealing process. The traditional bottom heater 400 includes a series of apertures 402 distributed around a perimeter of the heater 400 that direct heated air, as illustrated by arrows 404, into the cup bottom area without much control of the flow of the heated air. In these types of heaters, the majority of the air exiting the openings is concentrated on the container surface immediately adjacent the apertures 402, resulting in areas of localized hot spots, illustrated schematically at 406, and uneven distribution of heat within the cup bottom area.

The lack of control of the heated air can also result in over-heating of materials used in the cup bottom. For example, thermoplastic coatings are often provided on the parts of the cup for use in heat sealing and providing moisture or gas resistance to the material forming the cup. In the present example, over-heating of the cup bottom could result in the heat sealable material provided on the portions of the cup 300 forming the cup bottom, such as the floor 306 and the skirt 308, separating from the material forming the cup bottom, which could lead to incomplete seal formation during the cup bottom sealing process. When the cup is made of a fibrous material, such as paper stock, separation of a coating that acts as a moisture barrier could expose the fibrous material to liquid during use, potentially resulting in leakage of the cup. One area in particular in which this phenomenon can become problematic is at the intersection of the floor 306 of the cup bottom 304 and the skirt 308.

In contrast, the embodiments of the bottom heater described herein can be utilized to control the distribution of heated air during a container bottom sealing process by controlling a direction and an amount of the Coanda effect. The direction and amount of the Coanda effect can be utilized to minimize localized areas of high heat, more evenly distribute heat along the adjacent container surface, and decrease heating in undesired areas of the container, such as at the container bottom wall. The Coanda effect parameters such as the shape of the bottom heater outlet, as defined by the radius of curvature of the portions of the peripheral wall defining the outlet, the dimension $d_1$ of the air passage supplying air to the outlet, the angle of the walls defining the air passage, and the speed of the air supplied to the bottom heater can be varied to provide the desired direction and amount of the Coanda effect. For example, the Coanda effect parameters can be varied to provide a desired distribution of heating such that the majority of the air flows in a single direction, such as away from the container bottom. In another example, the Coanda effect parameters can be varied to control the heat distribution axially along the adjacent container surface to heat a larger surface area. Techniques such as infrared imaging can be used to observe the heat distribution and vary the Coanda effect parameters to provide the desired heat distribution pattern. In another example, computational fluid dynamics (CFD) modeling can be used to determine the configuration of the bottom heater to exhibit the desired Coanda effect.

Figure 9:
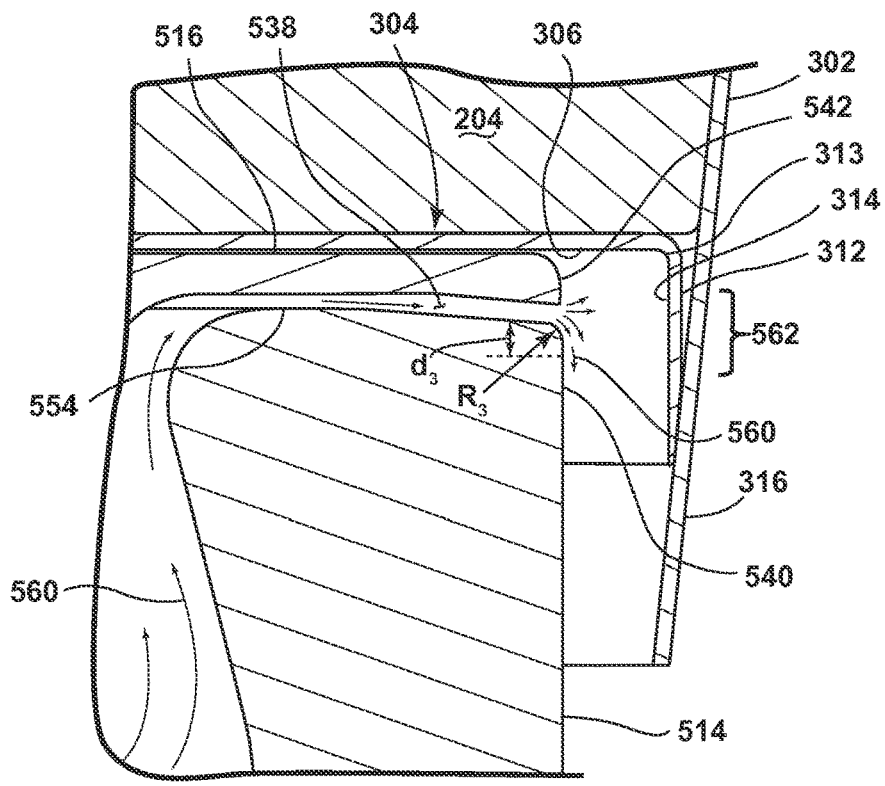
FIG. 9 is a partial cross-sectional view of a bottom heater for use with a container bottom according to an embodiment of the invention.
Figure 10:
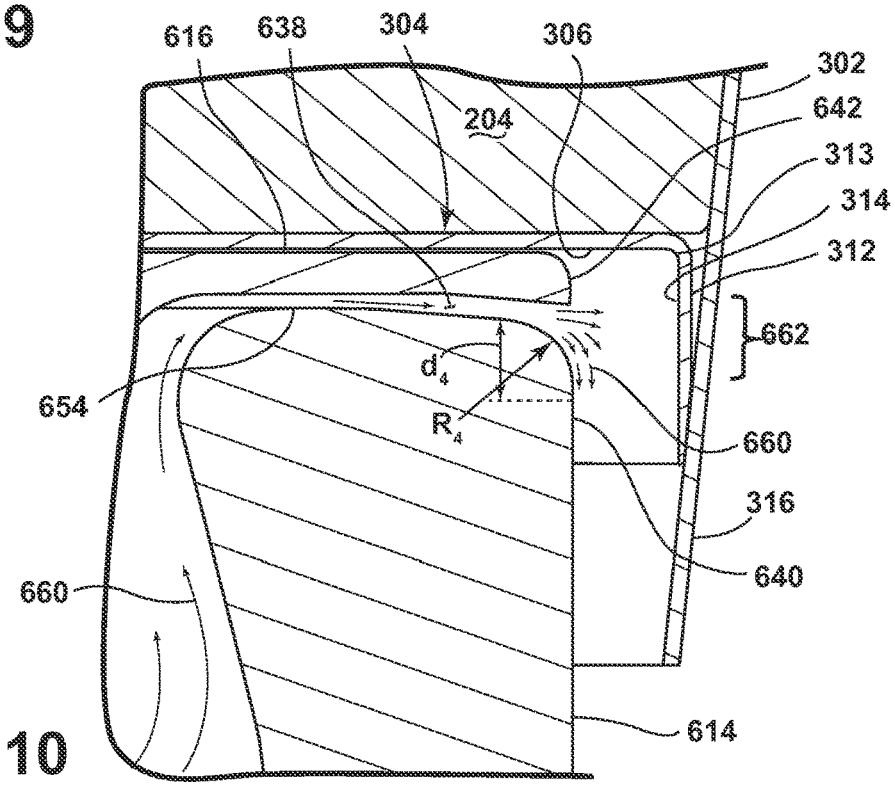
FIG. 10 is a partial cross-sectional view of a bottom heater for use with a container bottom according to an embodiment of the invention.
Figure 11:
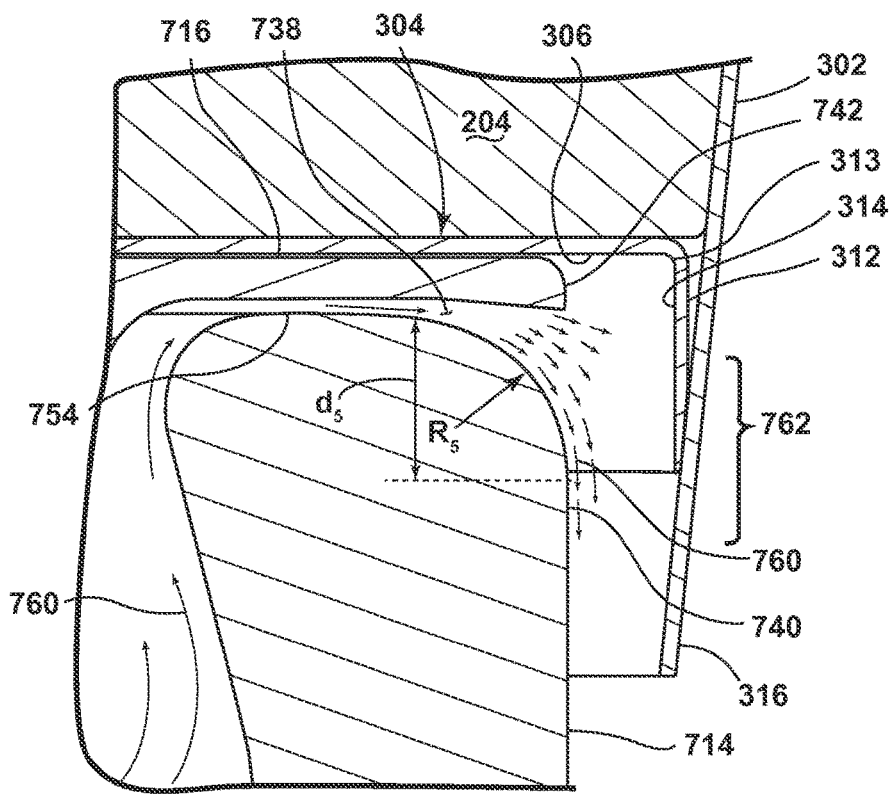
FIG. 11 is a partial cross-sectional view of a bottom heater for use with a container bottom according to an embodiment of the invention.

FIGS. 9-11 illustrate a bottom heater 510, 610, and 710, which is similar to the bottom heater 10 of FIGS. 1-3 except for the shape of the curved portion $R_1$ of the first portion 40. Therefore, elements of the bottom heater 510, 610, and 710 that are similar to the bottom heater 10 are labeled with the prefix 500, 600, and 700, respectively. FIGS. 9-11 schematically illustrate the effect of the configuration of the first portion 540, 640, and 740 on the Coanda effect exhibited by the flow of air through the outlet 518, 618, and 718 and illustrate the effect of the size of the radius of curvature of the curved surface $R_3$, $R_4$, and $R_5$, respectively, on both the amount and direction of the Coanda effect. The radius of curvature of the curved surfaces $R_3$, $R_4$, and $R_5$ are defined as described above for the curved surface $R_1$ of the bottom heater 10. In the exemplary scenario illustrated in FIGS. 9-11, it is desirable to minimize heating the floor 306 and corner 313 to avoid weakening the material in this area and to minimize heating of the end flange 316 of the cup 300.

Referring now to FIG. 9, a small radius of curvature for the curved surface $R_3$ defining the outlet 518 generates a smaller Coanda effect, a larger dispersion of air flow, and a narrower functional heating area 562, than the larger curved surface $R_4$ FIG. 10. The increased dispersion of the air flow can result in an undesirable amount of heat being provided to the corner 313 and the floor 306 of the cup 300, which can weaken the material in this area and possibly result in leaks in the cup 300.

In addition, because of the decreased amount of the Coanda effect, the smaller the distance $d_4$ the air flow remains attached to the surface of the first portion 540 and the narrower the functional heating area 562. The functional heating area 562 generated by the air flow can be determined by creating either a burn pattern inside the cup bottom 304 or using an infrared camera. A burn pattern can be created by holding the bottom heater at the correct position within the cup bottom for a predetermined period of time that is longer than what would normally be used in the production of a cup to burn or brown the cup material. The darker burned areas demonstrate the areas of highest heat concentration.

In contrast, as illustrated in FIG. 10, as the radius of curvature of the curved surface $R_4$ increases, the amount of the Coanda effect increases and the dispersion of air flow towards the cup floor 306 and corner 313 decreases, resulting in less undesirable heating of these areas of the cup bottom 304. In addition, the distance $d_5$ that the air flow remains attached to the surface of the first portion 640 increases, increasing the functional heating area 662 as a result.

Referring to FIG. 11, as the radius of curvature of the curved surface $R_5$ increases even more compared to the curved surface $R_4$ of FIG. 10, the Coanda effect also increases. As illustrated in FIG. 11, while the amount of the Coanda effect may be increased, this may not necessarily correspond to a desired dispersion or a desired length and position of the functional heating area 762. The increased distance $d_6$ that the air flow remains attached to the surface as a result of the Coanda effect can increase the dispersion of the air flow away from the desired area of the cup skirt 308, heating more of the end flange 316 and potentially shifting the functional heating area 762 downwards such that not all of the desired portion of the skirt 308 is heated.

In this manner, the bottom heater 10, 510, 610, and 710 can be configured to control the flow of heated air such that the amount and direction of the generated Coanda effect produces the desired dispersion and functional heating area. For example, when the radius of curvature of the curved surface $R_1$ of the bottom heater 10 is to first be determined, the bottom heater 10 can be configured to have a smaller than expected radius as a starting point. The bottom heater 10 can then be positioned within the cup and a heat profile determined using either the burn pattern or infrared camera method described above to determine what areas of the cup bottom are heated and the relative heating of those areas. The radius of curvature of the curved surface $R_1$ can then be increased until the desired heat profile demonstrating the desired dispersion and functional heating area is obtained. In the scenario illustrated in FIGS. 9-10, the radius of curvature of the curved surface $R_3$ of FIG. 9 results in a non-ideal heat profile in which too much heat is provided to the corner 313 and the dispersion of heat along the desired area of the skirt 308 is too narrow. However, the radius of curvature of the curved surface $R_5$ of FIG. 11 also results in a non-ideal heat profile in which the heat is spread out too far and is heating too much of the end flange 316, which is not desired in this example. FIG. 10 illustrates an example of a curved surface $R_4$ having a radius of curvature that is not too big and not too small to provide heated air to the desired area of the cup.

As described with respect to the traditional bottom heater 400 of FIG. 7, the heated air exiting the apertures 402 is concentrated on the cup surface immediately adjacent the apertures 402, resulting in localized hot-spots and uneven distribution of the heated air along the surfaces forming the cup bottom. In contrast, as described with respect to FIG. 5, the bottom heater 10 according to the embodiments of the invention utilizes the Coanda effect to control the flow of heated air as it exits the outlet 18 to more uniformly heat a larger surface area of the surfaces forming the cup bottom. The bottom heater 10 can be used to control the distribution of the heated air to increase the uniformity of heating both radially and axially along the surfaces forming the cup bottom, which can provide a wider area of softened heat sealing material as well as a more uniformly softened area to facilitate forming the cup bottom seal. In addition, the heated air can be controlled to avoid damaging the heat sealable material or other thermoplastic coating, such as a moisture barrier coating, that can lead to incomplete seal formation or leakage. This can be particularly useful in directing heat away from more sensitive areas of the cup, such as the intersection of the floor 306 of the cup bottom 304 and the skirt 308, while still sufficiently heating other areas of the cup.

Furthermore, because the bottom heater 10 provides for more control and uniform distribution of the heat along the surfaces forming the container bottom, the cup forming equipment can be used at higher speeds and higher heats, which can increase productivity, without over-heating the cup or inducing hot-spots. With the traditional bottom heater 400, the heated air exiting the apertures 402 is concentrated on the container surface immediately adjacent the apertures 402. In order to increase the heat in areas of the container surface farther away from the apertures 402, the heat of the air exiting the apertures 402 may have to be increased to an extent that the areas immediately adjacent the apertures 402 are damaged.

To the extent not already described, the different features and structures of the various embodiments of the invention may be used in combination with each other as desired. For example, one or more of the features illustrated and/or described with respect to one of the bottom heater 10, 110, 510, 610, 710, container forming machine 200, and container 300 can be used with or combined with one or more features illustrated and/or described with respect to the other of the bottom heater 110, 510, 610, 710, container forming machine 200, and container 300. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A container forming machine for assembling a container bottom to a sleeve to form a container, the container forming machine comprising:
    a mandrel forming a surface for supporting at least a portion of the sleeve and terminating in a first end for supporting at least a portion of the container bottom relative to the sleeve; and
    a bottom heater comprising a circumferentially curved body having a peripheral wall terminating at an end wall, and a heated air passage terminating in an outlet in the peripheral wall, the bottom heater movable relative to the mandrel to position the outlet relative to the sleeve and the container bottom;
    wherein a shape of at least a portion of the peripheral wall defining the outlet is curved axially along the body such that at least a portion of the heated air exiting the outlet is fluidly attached to an adjacent portion of the peripheral wall after exit because of the Coanda effect.

2. The container forming machine of claim 1 wherein the outlet is continuous and extends at least partially about a perimeter of the peripheral wall.

3. The container forming machine of claim 1 wherein the outlet separates the peripheral wall into first and second portions, and at least one of the first or second portions has a radius defining a curved portion of the outlet to control an amount and direction of the Coanda effect.

4. The container forming machine of claim 1 wherein the Coanda effect is maintained for a predetermined distance along the peripheral wall.

5. The container forming machine of claim 4 wherein the predetermined distance corresponds to a functional heating area in an adjacent surface of the sleeve, the container bottom, or a combination of the sleeve and container bottom.

6. The container forming machine of claim 5 wherein the functional heating area corresponds to a portion of the sleeve or the container bottom that overlaps with the other of the sleeve or the container bottom when the sleeve is folded inward to seal the container bottom with the sleeve.

7. The container forming machine of claim 1 wherein the heated air passage is defined by a first wall and a second wall and wherein the first wall, second wall, or both the first and second wall are provided at an angle with respect to an axis of the body to control an amount and direction of the Coanda effect.

8. The container forming machine of claim 1 wherein a proportion of the heated air attached to the adjacent portion of the peripheral wall because of the Coanda effect is varied to control an amount of heat provided to the container bottom.

9. The container forming machine of claim 1 wherein the container bottom comprises a floor and a depending skirt adjacent the sleeve, and wherein the outlet is shaped such that the Coanda effect directs the heated air away from the floor.

10. The container forming machine of claim 1 wherein the outlet comprises a plurality of discrete openings and wherein at least a portion of the peripheral wall defining the openings is shaped such that at least a portion of the heated air exiting the openings is fluidly attached to an adjacent portion of the peripheral wall after exit because of the Coanda effect.

11. The container forming machine of claim 10 wherein the plurality of discrete openings separates the peripheral wall into first and second portions, and at least one of the first and second portions for each of the plurality of discrete openings has a radius defining a curved portion of the opening to control an amount and direction of the Coanda effect.

12. The container forming machine of claim 1 wherein a radius defining a curved portion of the outlet, a height of the heated air passage, and an angle of at least one wall defining the heated air passage with respect to an axis of the body are configured to control an amount and direction of the Coanda effect.

13. A container forming machine for assembling a container bottom to a sleeve to form a container, the container forming machine comprising:
 a mandrel forming a surface for supporting at least a portion of the sleeve and terminating in a first end for supporting at least a portion of the container bottom relative to the sleeve; and
 a bottom heater comprising:
  a body having a peripheral wall terminating at an end wall; and
  a heated air passage defined by at least a top wall and a bottom wall, wherein at least one of the top wall or the bottom wall leads into the peripheral wall along a curved surface to define a curved outlet;
 wherein heated air flows through the curved outlet along the curved surface and along an adjacent portion of the peripheral wall for a predetermined distance due to the Coanda effect.

14. The container forming machine of claim 13 wherein the curved outlet is continuous.

15. The container forming machine of claim 14 wherein the curved outlet extends entirely about a perimeter of the peripheral wall.

16. The container forming machine of claim 13 wherein the curved outlet separates the peripheral wall into first and second portions, and at least one of the first or second portions has a radius defining a curved portion of the curved outlet to control a direction of the Coanda effect.

17. The container forming machine of claim 13 wherein the Coanda effect is maintained for a predetermined distance along the peripheral wall.

18. The container forming machine of claim 17 wherein the predetermined distance corresponds to a functional heating area in an adjacent surface of the sleeve, the container bottom, or a combination of the sleeve and the container bottom.

19. The container forming machine of claim 18 wherein the functional heating area corresponds to a portion of the sleeve or the container bottom that overlaps with the other of the sleeve or container bottom when the sleeve is folded inward to seal the container bottom with the sleeve.

20. The container forming machine of claim 13, wherein the top wall, bottom wall, or both the top and bottom wall are provided at an angle with respect to an axis of the body.

21. The container forming machine of claim 13 wherein a proportion of the heated air attached to the adjacent portion of the peripheral wall because of the Coanda effect is varied to control an amount of heat provided to the container bottom.

22. The container forming machine of claim 13 wherein the curved outlet comprises a plurality of discrete openings and wherein at least a portion of the peripheral wall defining the openings is shaped such that at least a portion of the heated air exiting the openings is fluidly attached to an adjacent portion of the peripheral wall after exit because of the Coanda effect.

23. The container forming machine of claim 22 wherein the plurality of discrete openings separates the peripheral wall into first and second portions, and at least one of the first or second portions for each of the plurality of discrete openings has a radius defining a curved portion of the opening to control an amount and direction of the Coanda effect.

24. The container forming machine of claim 13 wherein a radius defining the curved surface of the curved outlet, a height of the heated air passage, and an angle of at least one wall defining the heated air passage with respect to an axis of the body are configured to control an amount and direction of the Coanda effect.

25. The container forming machine of claim 1 wherein the curved portion of the peripheral wall defining the outlet can be defined as having a radius of curvature.

26. The container forming machine of claim 25 wherein the radius of curvature can be defined as the radius of a circular arc that best fits the curved surface of the curved portion of the peripheral wall defining the outlet.

27. The container forming machine of claim 13 wherein the curved surface defining the curved outlet can be defined as having a radius of curvature.

28. The container forming machine of claim 27 wherein the radius of curvature can be defined as the radius of a circular arc that best fits the curved surface defining the curved outlet.

* * * * *